F. F. EMORY.
FUNNEL.
APPLICATION FILED OCT. 18, 1913.
1,222,611.
Patented Apr. 17, 1917.
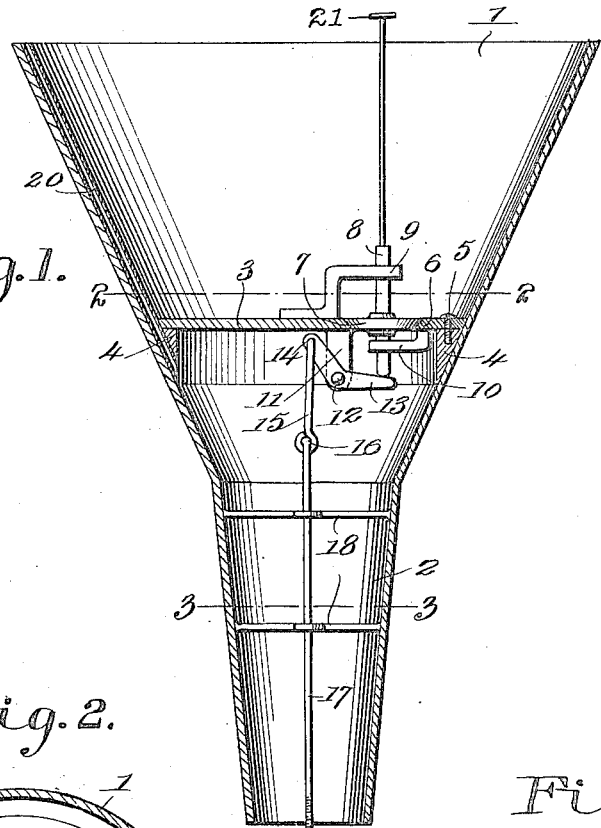
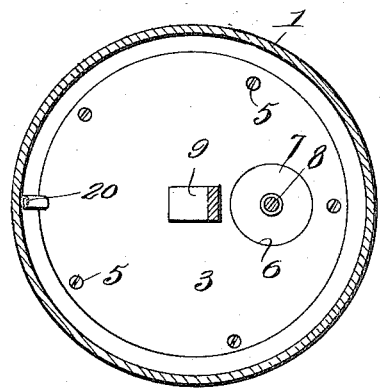
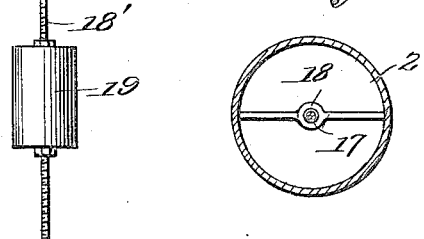
Witnesses
Wm. H. Mulligan
Wm. E. Vack Jr.
Inventor
Francis F. Emory,
By Richard Lewen,
his Attorney

UNITED STATES PATENT OFFICE.

FRANCIS F. EMORY, OF PHILADELPHIA, PENNSYLVANIA.

FUNNEL.

1,222,611.

Specification of Letters Patent.

Patented Apr. 17, 1917.

Application filed October 18, 1913. Serial No. 796,007.

*To all whom it may concern:*

Be it known that I, FRANCIS F. EMORY, citizen of the United States, residing at Philadelphia, in the county of Philadelphia and State of Pennsylvania, have invented certain new and useful Improvements in Funnels, of which the following is a specification.

This invention relates to an improved funnel wherein means is provided for operating a specially devised valve, the latter being so arranged within the funnel body, to open and close communication between the said body and the funnel spout, the said valve being actuated automatically by the liquid contents of the container or receptacle in connection with which the funnel is used.

The invention further contemplates the provision of novel means including a float member so positioned with respect to the funnel and so connected to the valve as to actuate the latter to automatically close communication between the funnel and the spout thereof should the liquid contents of the container in connection with which the funnel is used rise to such a point as to endanger overflowing of the said container.

The above and additional objects are accomplished by such means as are illustrated in their preferred embodiment in the accompanying drawings, described in the following specification and then more particularly pointed out in the claim which is appended hereto and form a part of this application.

In describing my invention in detail reference will be had to the accompanying drawings wherein like characters denote like or corresponding parts throughout the several views, and in which:—

Figure 1 is a longitudinal sectional view of a funnel, the mechanism comprising the invention being associated therewith;

Fig. 2 is a section on the line 2—2 of Fig. 1;

Fig. 3 is a section on the line 3—3 of Fig. 1.

Referring now to the drawings wherein is illustrated the preferred embodiment of my invention the numeral 1 designates the funnel body to which the spout 2 is secured. Within the said body 1, at a point adjacent the lower end thereof, I provide a dividing wall or partition 3, the periphery of which is beveled and shaped to conform to the configuration of the body interior. A supporting band 4, the periphery of which is also beveled, is arranged within the body 1 directly beneath the said partition 3, the said band serving as a support for the partition, the latter being detachably secured thereto through the medium of a plurality of screws 5. A valve seat or opening 6, the edges of which are beveled as shown, is formed within the partition 3 at one side thereof, the said opening being normally closed by means of a vertically movable valve 7 through which a valve stem 8 extends, thereby disposing a portion of the said stem above and a portion below the said valve. Brackets 9 and 10 are arranged respectively upon the upper and lower faces of the partition 3, each bracket having an opening formed therein through which the valve stem 8 extends, the latter being so connected to the valve 7 as to move therewith.

Beneath the partition 3 and secured thereto at one side of the opening 6 formed therein I provide a depending lug 11 to which is pivotally secured as at 12 a bell-crank lever 13 one end of which is maintained normally in engagement with the lower extremity of the valve stem 8, the opposite end being pivotally secured as at 14 to a link 15 depending vertically therefrom. An eye 16 is formed at the lower extremity of the said link to which the operating rod 17 of the valve is connected, guides 18 being arranged in spaced relation within the funnel spout 2 through which the said rod extends. The rod 17 is of sufficient length to extend or depend beneath the lower extremity of the spout 2 to position the same, when the funnel is in use, in the container or receptacle to be filled, the said extended portion of the rod 17 being exteriorly threaded as at 18' to provide for the vertical adjustment of a float member 19 carried thereby.

At one side of the body 1 and supported in parallelism therewith, I provide a vent 20, the upper extremity of which terminates at a point upon the same plane as the upper end of the funnel body 1, and the lower end at a point below the partition 3 thereby providing for the escape of air within the container or receptacle (not shown), and within the spout and lower portion of the said body 1 during a filling operation.

Having described the construction and arrangement of the several parts comprising the present invention, it now remains to set forth a little more fully the operation thereof. In Fig. 1 of the drawings, the float member 19 is shown in its uppermost or raised position, the liquid contents of the container or receptacle in connection with which the funnel is used serving as a support for the float member. The operating rod 17 being connected to the bell crank lever 13 by means of the link 15, it is apparent that the said lever is actuated or moved upon its pivot point 12 a sufficient distance to withdraw the free end of the said lever from firm engagement with the valve stem 8, thereby permitting the valve 7 to automatically seat itself within the opening 6 to effectually close communication between the upper portion of the body 1 and the funnel spout 2. During a filling operation, a manipulation of a suitable handle 21 or the weight of the float member 19 is sufficient to rock the lever 13 and cause the free end thereof to firmly engage the valve stem 8 and maintain the same in its uppermost position, and, as the valve 7 is rigid with respect to the stem 8, it is further apparent that the said valve is unseated thereby providing for the passage of the contents of the funnel through the opening 6 to the container in connection with which it is used.

The use of the vent 20, guides 18 and brackets 9 and 10 is obvious.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a funnel, an annular supporting ledge fixedly secured to and within the funnel, a partition resting on said ledge, means penetrating the partition and engaging the ledge to removably fasten the partition in place, said partition being provided with an opening at one side of its center; a valve rod mounted to operate in a true vertical plane and concentric to said opening, bearings for said rod, a valve on said rod movable therewith to close said opening, a support rod mounted to operate in a true vertical plane and at one side of said valve rod, bearings for said support rod, a float on said support rod, a link pivoted to said support rod, and a bell crank lever pivotally fastened at one end to said link and engaging at its opposite end with said valve rod to operate said valve, the mentioned connection between said valve rod and said support rod precluding a binding tendency of the said two rods with their respective bearings.

In testimony whereof I affix my signature in presence of two witnesses.

FRANCIS F. EMORY.

Witnesses:
EDWARD DALLETT,
GEORGE H. CONNER.

Copies of this patent may be obtained for five cents each, by addressing the "Commissioner of Patents, Washington, D. C."